No. 765,045. PATENTED JULY 12, 1904.
H. SHEAF & H. A. STONARD.
MEANS FOR ATTACHING ELASTIC TIRES TO WHEELS.
APPLICATION FILED NOV. 11, 1901.
NO MODEL.

No. 765,045.

Patented July 12, 1904.

UNITED STATES PATENT OFFICE.

HORATIO SHEAF, OF WANSTEAD, AND HERBERT ALLARD STONARD, OF LEYTONSTONE, ENGLAND.

MEANS FOR ATTACHING ELASTIC TIRES TO WHEELS.

SPECIFICATION forming part of Letters Patent No. 765,045, dated July 12, 1904.

Application filed November 11, 1901. Serial No. 81,906. (No model.)

*To all whom it may concern:*

Be it known that we, HORATIO SHEAF, schoolmaster, residing at the National School, Wanstead, in the county of Essex, and HERBERT ALLARD STONARD, traveler, residing at 57 Colworth road, Leytonstone, in the county of London, England, both subjects of the King of Great Britain and Ireland, have invented certain new and useful Improvements in Means for Attaching Elastic Tires to Wheels, of which the following is a specification.

This invention relates to improved means for attaching elastic tires to wheel-rims whereby the same may be readily detached, and has reference especially to solid india-rubber tires. According to this invention the said tires, which are of circular or other cross-section, are formed of a length a little more than the circumference of the wheel-rim and have a central perforation or passage running through their whole length, through which passage are passed two metal wires, the ends of which are joined together to form endless wires or rings or one wire doubled, the ends being secured to form a doubled circular wire. These wires are employed for fastening the tire to the wheel-rim, for which purpose they are twisted together, so as to diminish or contract their length or circumference, thus drawing them and the tire tightly around the rim of the wheel. Any suitable tool or device may be employed for twisting the said wires together. In some cases a single endless wire may be employed, passing through the tire and having a portion of its length or circumference provided with a second length of wire attached at each end to the endless wire, aforesaid, so as to form for the said length double wires, which when they are twisted together by any suitable instrument cause the endless wire to contract or shorten, and thus tighten the tire around the rim.

Figure 1:
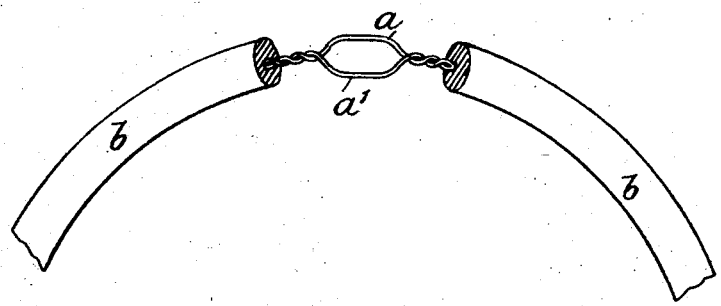
Figure 2:
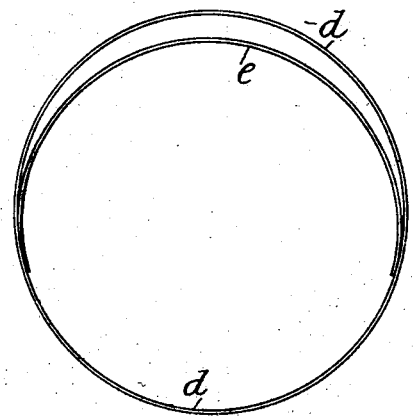

In the accompanying drawings, Figure 1 shows the ends of a tire fitted with two wires partly twisted together, and Fig. 2 is a similar view of a single wire having a short length of wire attached to a portion of its circumference in its untwisted condition.

In Fig. 1, $a$ $a'$ are the two wires threaded through the tire $b$, their ends being attached together. The tire is then fitted onto the wheel-rim, and the wires are twisted together, as shown, so as to tighten the tire around the rim.

Fig. 2 shows a single wire $d$, provided with a short length of wire $e$, which when the tire is fitted to the wheel-rim is twisted with the wire $d$, thus tightening the tire around the said rim.

Having now fully described the nature of our said invention, what we claim, and desire to secure by Letters Patent, is—

The improved method of attaching solid elastic tires to wheels comprising two wires passed through a longitudinal passage formed in the tire, which latter has previously been cut across or severed for this purpose, brazing the ends of the wires together to form two separate endless wires, and twisting the said endless wires together so as to tighten them, and consequently the tire, upon and around the rim of the wheel, substantially as described.

In witness whereof we have hereunto set our hands in the presence of two witnesses.

HORATIO SHEAF.
HERBERT ALLARD STONARD.

Witnesses:
 FREDERICK MICAH MELLOR,
 JOHN JAMES ROWLEY.